July 11, 1961     J. A. OGLE     2,991,743
OPTICAL DEVICE FOR IMAGE DISPLAY
Filed July 25, 1957     5 Sheets-Sheet 1
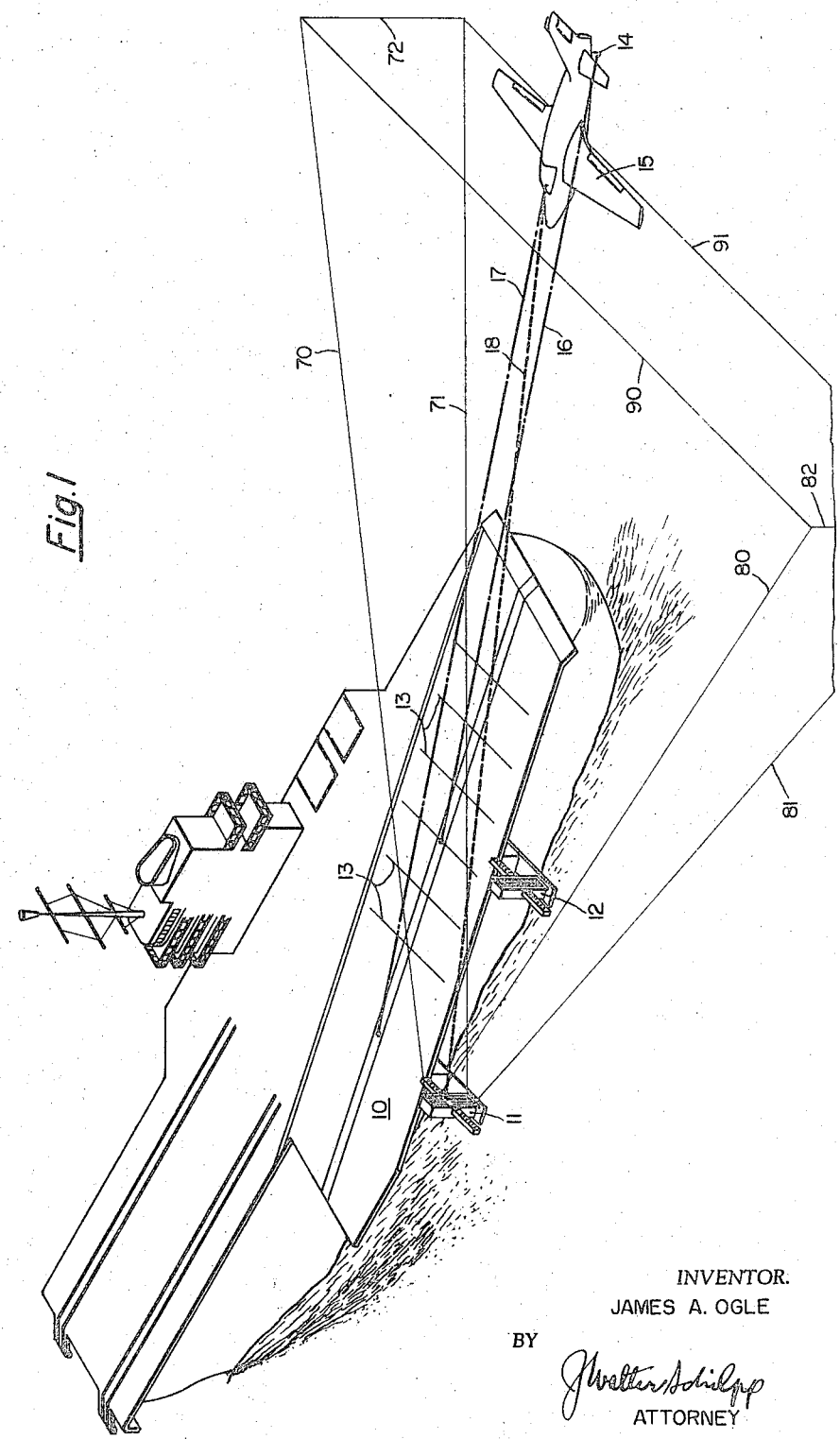
INVENTOR.
JAMES A. OGLE July 11, 1961     J. A. OGLE     2,991,743
OPTICAL DEVICE FOR IMAGE DISPLAY
Filed July 25, 1957     5 Sheets-Sheet 3
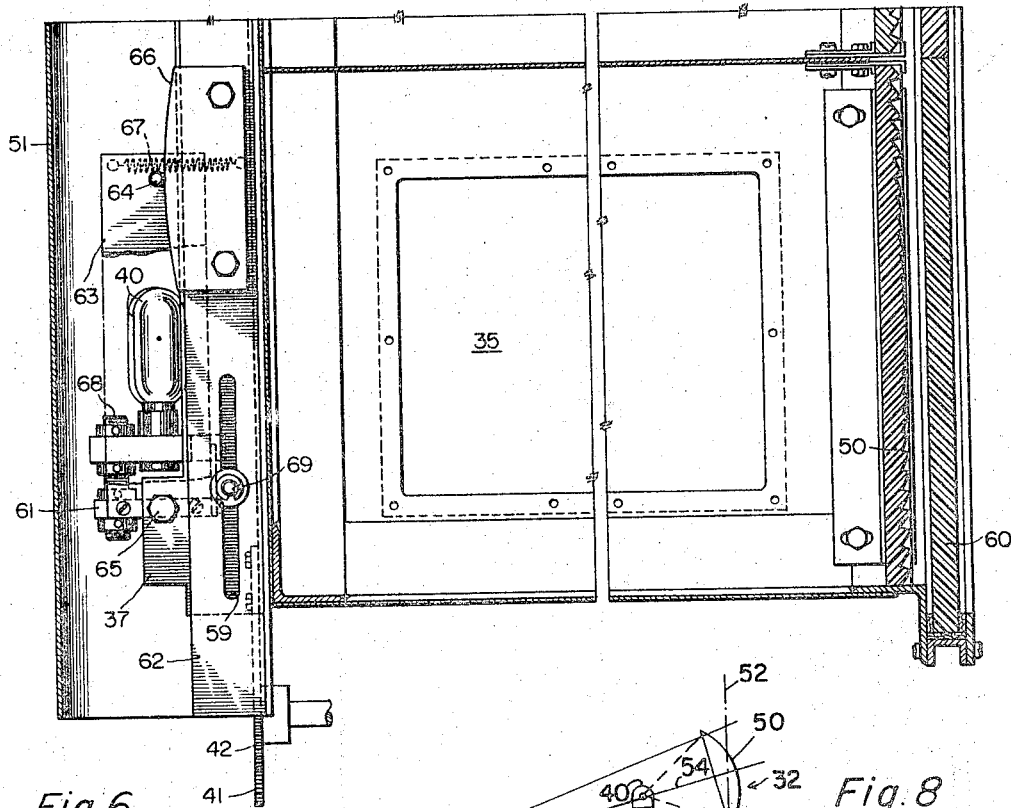
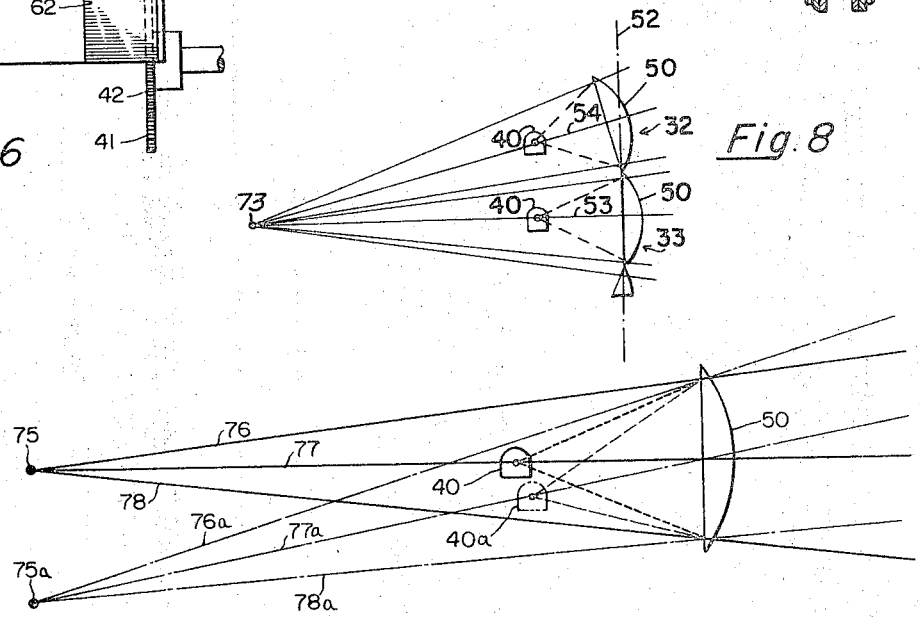
INVENTOR.
JAMES A. OGLE
BY
ATTORNEY

INVENTOR.
JAME A. OGLE

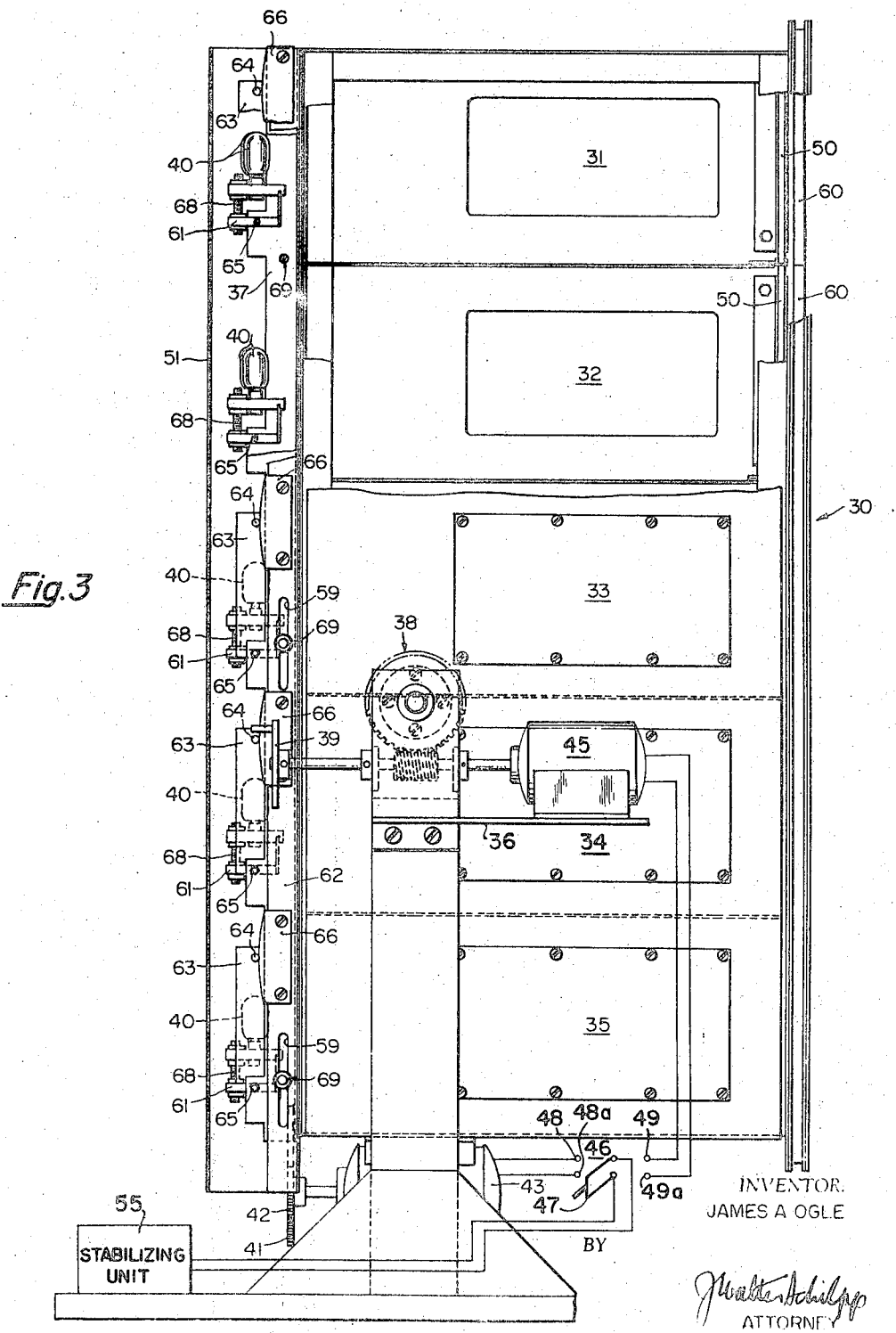

United States Patent Office 2,991,743
Patented July 11, 1961

2,991,743
OPTICAL DEVICE FOR IMAGE DISPLAY
James A. Ogle, Paoli, Pa., assignor to Burroughs Corporation, Detroit, Mich., a corporation of Michigan
Filed July 25, 1957, Ser. No. 674,228
14 Claims. (Cl. 114—43.5)

This invention relates to an optical display system and more particularly to an optical glide path indicator for visually indicating to a pilot the proper glide angle for the safe landing of an aircraft on an area of restricted size.

Present day high speed aircraft have closing speeds at landing of the order of 100 knots. Normally the length of airport runways is about 6,000 feet and the pilot has ample time to make the necessary adjustments in his angle of descent to effect a safe landing. However, on landing areas of limited size such as the flight decks of modern aircraft carriers which vary from about 580 feet to about 900 feet in length, the problem of landing safely becomes severe.

An older method of assisting the pilot in landing his aircraft, and one which is still used extensively, utilizes the services of a landing signal officer who stands toward the stern of the ship on the port side facing the oncoming aircraft and signals landing instructions to the pilot by means of small paddles held in each hand. These landing instructions become recognizable to the pilot at a distance of about 500 feet from the ship. Obviously from what has been said regarding the closing speed of the aircraft and the length of the landing area, neither the Landing Signal Officer nor the pilot are able to perceive or correct small but significant errors in the aircraft's glide angle.

A more precise method of aiding a pilot to fly his aircraft along a defined descent path is described by H. C. N. Goodhart in his U.S. Patent No. 2,784,925. This method comprises a mirror adapted to be positioned inclinably at the landing area to show to the pilot the image of a first fixed marker arranged some distance in front of the mirror in such position that it is reflected by the mirror. The pilot's line of sight to the image of the first fixed marker is arranged to coincide with his line of sight to a directly visible second fixed marker at the landing area so as to define the angle of the desired path in elevation from the mirror.

The optical landing system of the instant invention consists of an assembly having a viewing window oriented toward oncoming aircraft. The assembly consists of a plurality of cells; each of which comprise reference lights and lenses so disposed with respect to one another that a virtual image of the reference lights is produced. The plurality of virtual images produced by the cells are made to coincide and the pilot sees a single virtual image through the viewing window. The image of the lights as seen by the pilot is a horizontal bar of light which appears to move up or down depending upon the aircraft's angle of approach. Associated with the assembly but external thereto are fixed rows of lights which establish a datum line. The correct glide angle is indicated by the visual alignment of the bar of light with the datum line. Having made the necessary adjustments in his angle of descent, the pilot is required only to maintain a steady course to achieve the proper touch-down point for a safe landing.

The instant invention possesses a number of significant advantages over the prior art methods which will become apparent as the system is hereinafter described. The aforementioned mirror landing system utilizes a horizontal row of lamps spaced approximately 150 to 200 feet from the mirror and trained thereon so that the lamps are reflected in the mirror. The instant invention utilizes internal reference lights and lenses thereby eliminating the external marker lamps and effecting a saving in space, electrical wiring and power.

The characteristics of aircraft differ appreciably with regard to the distance between the pilot's line of sight and the hook on the underside of the aircraft adapted to engage one of a plurality of arresting wires stretched about eight inches above the flight deck. In order to compensate for different hook-to-eye distances and provide a safe touch-down point, the mirror assembly is mounted on an elevator which adjusts for vertical distances with respect to the landing area while maintaining the same glide angle. The combined weight of the mirror assembly and the elevator platform applied at deck height and offset from the center line of the ship is considered highly undesirable from the standpoint of stability. The necessary hook-to-eye distances can be established conveniently through the use of the present invention by horizontally spacing several of the indicators along the edge of the landing area and actuating one of the forward indicators for larger aircraft while smaller aircraft use indicators further aft on the landing area. Consequently an elevator is not required and since the lens assembly weighs considerably less than a mirror assembly, stability problems are minimized. Obviously too, a plurality of mirror assemblies cannot be horizontally spaced along the landing area in an arrangement similar to that previously described since the external marker lights would be reflected by all of the mirrors and there appears to be no convenient way of selectively actuating one of the indicators.

Another problem associated with the use of visual landing aids is solar reflection from the face of the indicator. In the case of the mirror, a very large percentage of the light incident on the face of the mirror is reflected toward the oncoming aircraft. Any attempt to eliminate the reflection by inclining the mirror with reference to the horizon results in a deviation from the specified glide path. In one embodiment of the present invention the face of the indicator is made up of a plurality of cylindrically ribbed lenticulars whose primary function is the horizontal spreading of the rays emerging from the imaging lens. In addition these lenticulars provide a random distribution of angles of reflection for the sun's rays which fall upon the lens assembly with equal angles of incidence. The resulting scatter of the reflected light reduces the apparent intensity of the reflection to a tolerable level. If it is desired to eliminate the reflections completely, either of the following will be effective: inclining the lenticular spreaders with respect to the lens assembly or inclining the lens assembly with respect to its horizontal reference and then moving the internal reference lamps which causes the glide path to be raised or lowered relative to the lens assembly. This latter feature of optically reorienting the landing system by changing the relative position of the reference lamps with respect to the imaging lens is useful for pitch correction. Instead of controlling the movement of the entire lens assembly, the stabilization means can be coupled directly to the lamp mounting bracket while the assembly remains in a fixed position on the landing area.

The use of the instant invention is not restricted to shipboard landings but rather its light weight, moderate size, comparatively low power requirement which may be battery furnished, and its ease of operation make it especially suitable for use on land bases of restricted size, particularly for emergency landings.

Accordingly, it is a prime object of the instant invention to provide optical indicating means whereby high speed aircraft can land safely on areas of restricted size.

Another object of this invention is to provide an improved glide bath indicator.

A further object of the instant invention is to provide an optical device for displaying the image of a plurality of reference objects at a predetermined point in space.

A still further object of the instant invention is to provide optical means for indicating to an observer deviations in a defined path of travel.

In addition other features and objects of the invention will be described throughout the following detailed description of the invention and illustrated in the accompanying drawings in which:

FIG. 1 is a perspective view of an aircraft carrier fitted with two assemblies of the optical glide path indicator of the present invention.

FIG. 3 is a side view of the lens assembly containing five cells.

FIG. 6 is a section view along the line 6—6 of FIG. 4.

FIG. 7 is an optical schematic depicting the effect on the glide path angle when the light source is moved relative to the imaging lens.

FIG. 8 is an optical schematic depicting a method of obtaining coincidence of the images formed in the optical cells of the indicator assembly.

The aircraft carrier depicted in FIG. 1 has an angled deck 10 which allows planes to land at the same time that others are catapulted from other portions of the deck. Two optical glide path indicators are shown, viz. 11 and 12, mounted on platforms along the deck edge on the port side of the ship. Arrester wires depicted as lines 13 are stretched across the landing area. The dashed line 16 indicates the path which will be followed by the hook 14 on the underside of an aircraft 15 when making a proper landing, while the dashed line 17 indicates the path simultaneously followed by the pilot's eye. Dotted line 18 represents the pilot's line of sight to the forward glide path indicator 11. As hereinbefore mentioned only one of the glide path indicators is actuated depending upon the hook-to-eye distance of the landing aircraft. In FIG. 1 it is assumed that the aircraft is relatively large and requires a touch-down point somewhat forward on the flight deck. For the particular location of aircraft 15 relative to the ship's flight deck, the lines 90, 82, 91 and 72 define an approximate rectangular area within which the pilot would be able to see the virtual image produced by indicator 11.

Figure 2A:
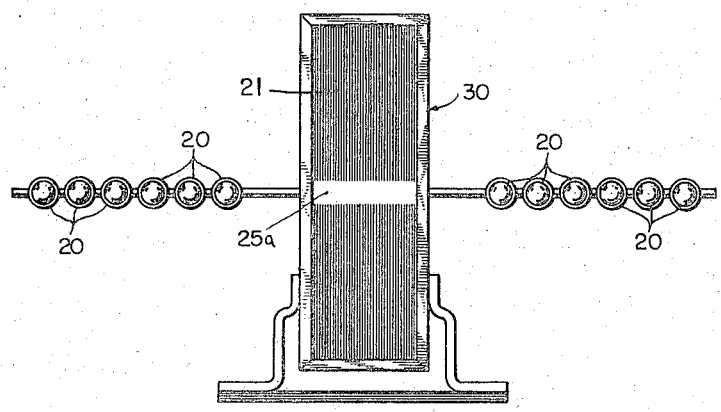
FIGS. 2A, 2B and 2C depict the position of the virtual image of the optical assembly relative to the datum lights as viewed by the pilot. 2A as seen by the pilot indicates that he is on the correct glide path; 2B, that he is approaching too high, i.e., at too steep an angle; and 2C, that he is aproaching too low.
Figure 2B:
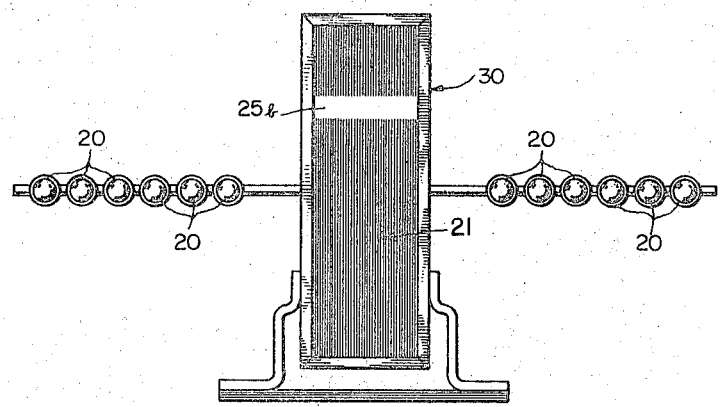
Figure 2C:
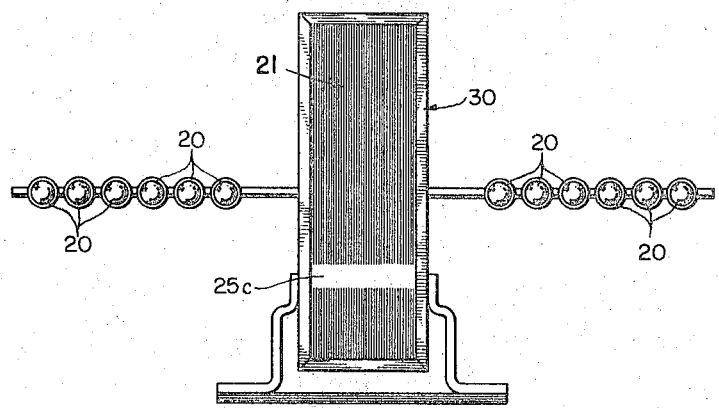

The virtual image of the internal reference lamps as provided by the lens assembly is seen through the viewing window, or system pupil 21, of the indicator as the horizontal bars of light 25a, 25b and 25c, depicted in FIGS. 2A, 2B and 2C respectively. The pilot observes the apparent vertical position of the image in relation to two fixed rows of datum lights 20 arranged on either side of the lens assembly 30 and perpendicular to the center of the assembly. As the pilot approaches the carrier along the glide path 17, he views the bar of light 25a, as depicted diagrammatically in FIG. 2A. If his approach is too high, the pilot will view the bar of light in position 25b in FIG. 2B; and if the pilot approaches below the optimum glide path he views the bar of light in position 25c in FIG. 2C.

Figure 4:
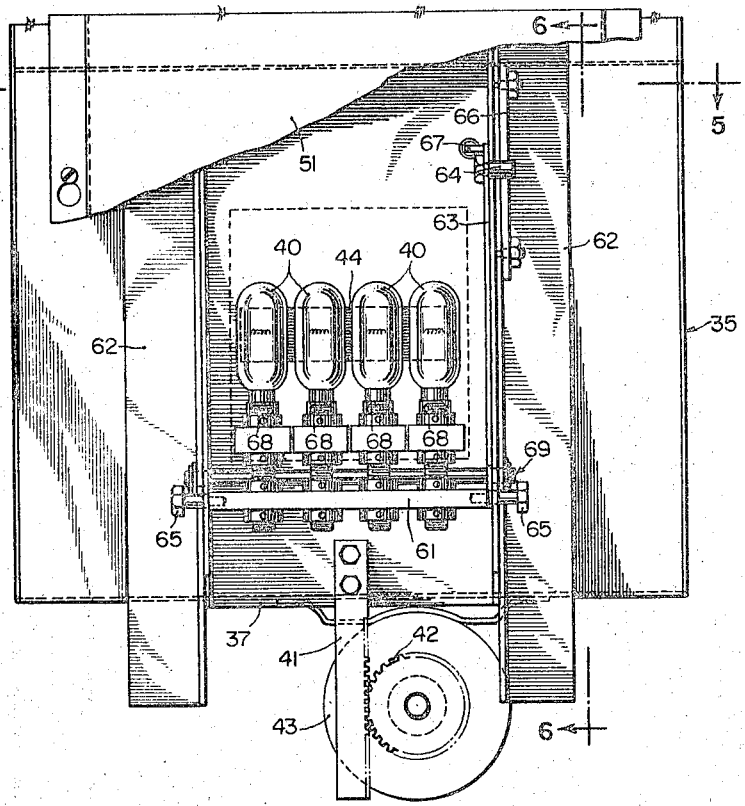
FIG. 4 is a rear view of the lowermost cell.
Figure 5:
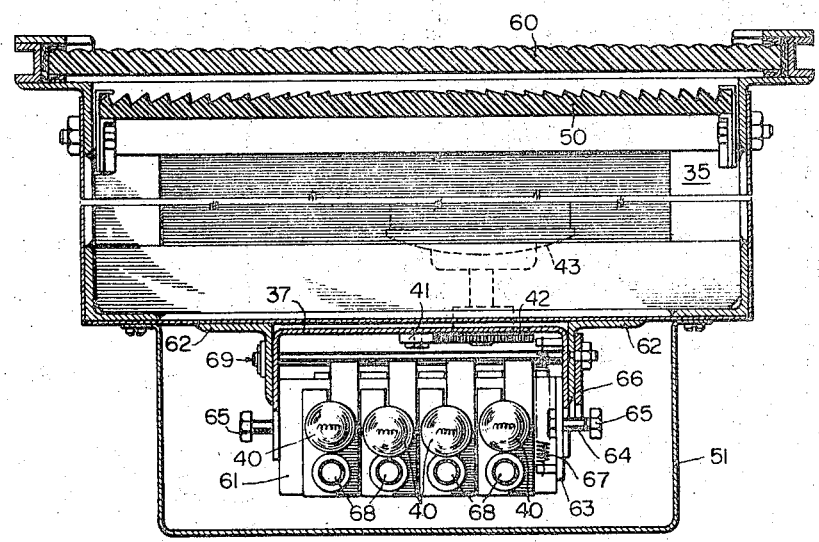
FIG. 5 is a section view along the line 5—5 of FIG. 4.

A specific embodiment of the optical glide path indicator shown in FIG. 3 consists of five cells 31, 32, 33, 34 and 35, mounted in lens assembly 30 whose major axis is vertical, each cell comprising a group of four reference lamps 40, shown in greater detail in FIGS. 4 and 5, and a Fresnel lens 50, also shown diagrammatically in FIGS. 5 and 6. In front of each of the Fresnel lenses, that is on the side away from the lamps, is mounted a lenticular spreader 60, also depicted in FIGS. 5 and 6. The lamp assemblies for the five cells are ganged together by virtue of their common mounting bracket 37 which may be raised or lowered relative to the physical structure. As hereinbefore mentioned the vertical movement of the lamps with respect to the Fresnel lenses corrects for changes in the glide angle which results from the pitching of the ship or the inclining of the device to avoid solar reflections. FIG. 4 shows a rack 41 and pinion 42 for moving the lamp bracket 37. The rectangular slot 44 in lamp bracket 37 serves as a light baffle to diminish the scattering of light within the cell. Motor 43 driving the pinion gear 42 may be controlled by gyroscopic or other stabilizing means 55 and should conveniently have provision for manual control. In order to apply the control signal generated by stabilizing unit 55 to motor 43, the arm 47 of switch 46 must be moved to engage contacts 48 and 48a. An alternate method of stabilizing the lens assembly will be described later. The cover section 51 depicted in FIG. 5 protects the lamp bracket assembly from environmental or accidental damage. In the enlarged side view of cell 35, as depicted in FIG. 6, the vertical movement of lamp mounting bracket 37 with respect to the lens assembly is guided by a shaft and retainer ring assembly 69 which moves in a slotted opening 59 of angle section 62. It will be observed that as the mounting bracket 37 is moved up or down, the lamps 40 are simultaneously moved toward or away from Fresnel lens 50. This is accomplished by allowing the lamp support 61, including lever 63 and cam follower 64 to pivot on lug 65 and thereby cause the lamps to follow the curvature of cam 66. Spring 67 maintains the cam follower in close relationship with cam 66. Screw 68 is used for adjusting the vertical displacement of the lamp filaments in a cell with one another and with the Fresnel lens 50. The necessity for the slight horizontal movement of the lamps in conjunction with their vertical movements will hereinafter be considered in detail. Means for inclining the lens assembly with respect to its horizontal reference are depicted in FIG. 3 as gear assembly 38, drive wheel 39, and motor 45 mounted on shaft 36. Although both manual means and a motor are depicted for driving gear assembly 38, it should be understood that if the motor 45 has provision for manual control, the drive wheel 39 may be eliminated. The inclination of the lens assembly is necessary to establish the proper glide angle, and when such inclination is controlled by stabilization means, an alternate method of correcting for pitch error is provided. In this latter method, the switch arm 47 is moved to engage contacts 49 and 49a so as to apply the signal from the stabilizing unit to motor 45. Gear assembly 38, driven by motor 45 continuously adjusts the inclination of the entire lens assembly 30 to compensate for the pitching movement of the ship. The control circuit of motor 43 is de-energized when the stabilizing signals are applied to motor 45. Thus, pitch correction of the indicator may be accomplished in either of two ways, namely, by fixing the inclination of the lens assembly and by allowing stabilizing unit 55 and motor 43 to adjust the position of the reference lamps 40 with respect to the Fresnel lenses, or by fixing the positions of the reference lamps 40 with respect to their associated lenses and allowing stabilizing unit 55 and motor 45 to adjust the inclination of the lens assembly 30 with respect to a horizontal reference.

As hereinbefore described, the lens assembly may also be inclined to eliminate solar reflection from its face. In this instance the lamps must be repositioned with respect to the Fresnel lenses to restore the original glide angle. FIG. 7 depicts a light source 40 placed on the optical axis of a lens 50 which produces a virtual image 75 of the source. The lines 76, 77 and 78 which represent light rays appearing to emanate from point 75 define an angle within which an observer stationed at the right of the lens would be able to view the virtual image. If light source 40 is moved downward to the position designated 40a the image of the filament now appears at 75a and the light rays 76a, 77a and 78a define a vertical viewing angle which is displaced upward from that produced by light source 40 in its original position. In effect moving the light source downward with respect to the lens moves the virtual image of the source downward thereby requiring the observer to move upward with respect to his original position if he is to keep the image in sight. In terms of the glide path indication, moving the light source downward results in a steeper glide angle relative to the landing area.

In operation the lens assembly is positioned on or adjacent to the landing area and is inclined with respect to its horizontal reference to establish a glide angle of approximately three or four degrees. As an alternate method of establishing the proper glide angle the major axis of the lens assembly may be fixed in a vertical plane while the light source is moved with repect to its associated Fresnel lens.

Each group of four lamp filaments in a particular cell is imaged by its Fresnel lens at a distance of approximately 150 feet behind the lens. The image of the filaments is thus a virtual image visible only through the pupil which is the periphery of the Fresnel lens associated with that group of four lamps. Assuming that a single lens was used, the observer would be able to view the image of the filaments through a very small vertical range. However all the virtual images produced by the cells are made to coincide with one another. The coincidence of the virtual images may be accomplished in several ways. In the specific embodiment of the instant invention described herein, the filaments in each cell are displaced vertically with respect to the principal axis of their associated Fresnel lens such that rays of light traced from the optical center of the Fresnel lenses back through the corresponding filament in each cell converge at a common point. The lamp filaments are positioned with respect to the Fresnel lenses by adjustment screws 68 as depicted in FIGS. 4 and 6. The Fresnel lenses are all identically mounted with their principal axes respectively perpendicular to the major axis of the lens housing. An alternate method of causing the plurality of virtual images to coincide is to incline the Fresnel lenses with respect to one another in such a manner that their principal axes converge at a common point. This method is illustrated schematically in FIG. 8. Reference line 52 represents the longitudinal axis of the lens assembly 30. Fresnel lens 50 of cell 33 is mounted with its principal axis 53 perpendicular to the reference line 52. The image of lamp 40 of cell 33 appears at point 73. Lens 50 of cell 32 is positioned such that its principal axis 54 intersects axis 53 of cell 33 at point 73. Thus the image of lamp 40 formed by lens 50 in cell 32 also appears at 73, thereby coinciding with the lamp image formed in cell 33. In like manner, the lens 50 of cells 31, 34 and 35 would be positioned such that the virtual images formed thereby appear at 73. The lamp filaments in each cell are adjusted to lie in a plane which includes the principal axis of the lens through which they are imaged, said plane being perpendicular to the faces of the lens at the points of intersection. In this case the lamp filaments in each cell are placed so that they lie in the same plane as the principal axis of the lens through which they are imaged. Since the virtual images formed by each lens are made to coincide with one another, the observer cannot distinguish which virtual image he is seeing. The end effect for the observer is to see a single virtual image through the particular pupil which lies in his line of sight to the virtual image. The vertical viewing angle is depicted in FIG. 1 as the angle formed by the intersection of the two planes defined by lines 70, 80, 90, and 71, 81, and 91 respectively. This angle is approximately 1.5 degrees.

The sensitivity of the present system is measured by the apparent vertical change in position of the virtual image as seen by the observer in the indicator for a given change in vertical position of the aircraft. The sensitivity varies directly with a change in the distance behind the lens at which the virtual image of the light source appears. For the specific application, a distance of approximately 150 feet has been found to be satisfactory. Distances somewhat greater than 150 feet increase the sensitivity but do not allow for reasonable deviations above or below the optimum glide path while distances somewhat less than 150 feet decrease the sensitivity to such an extent that the pilot is unaware of significant errors in his approach angle.

A practical filament size has been found to be a single coil about 70 thousandths of an inch in diameter placed with its axis perpendicular to the major axis of the lens assembly. The distance from the Fresnel lens to the lamp is about two feet; the magnification of the system is therefore approximately seventy-five times. The ideal virtual image would have a linear height of about five inches but due to disturbances in the Fresnel surface and also chromatic aberration, the images appear somewhat higher. In the particular embodiment of the instant device, four lamps were used in each cell to obtain the necessary candlepower and to insure that no appreciable loss of brilliance in the image of the "line of sight" would be apparent to the observer if one lamp should suddenly fail.

As hereinbefore mentioned, lenticular spreaders are mounted in front of the Fresnel lenses. These spreaders are made up of cylindrically ribbed pieces in which the axes of the ribs are mounted vertically. The action of the cylindrically ribbed lenticular is well known in the art and can most simply be considered as that of a sequence of prism angles with sufficiently frequent repetition so that they appear to an observer to be continuously adjacent. This sequence of prism angles causes a lateral or horizontal spreading of the rays emerging from the Fresnel lenses and thus allows a virtual image to lose discrimination in the horizontal azimuth and be visible through a predetermined horizontal range. In this instance the virtual image is visible from the stern of the carrier through an angle of approximately fifty degrees. This horizontal viewing angle is depicted in FIG. 1 as the angle formed by the intersection of the two planes defined by lines 70, 71, 72 and 80, 81, 82, respectively. Since the cylindrical lenticular spreaders lie in a part of the system where the image as seen through them is at a substantial distance, the skew vectors of rays passing through the spreaders is negligible and no distortion of the image results therefrom. As a result of the action of the lenticular spreaders the observer cannot distinguish the virtual images formed of the four filaments in a particular cell.

The four adjacently placed filaments in a particular cell must in the final analysis be imaged as a line image and appear as a rectangular shaped area in the viewing window, or more precisely, the system pupil 21. The system pupil comprises a plurality of contiguous cell pupils. Since the periphery of any lens is a potential stop, the cell pupil is a function of both the Fresnel lens 50 and the lenticular spreader 60 associated therewith. However in the present system, the cell pupil is substantially the same as the periphery of the Fresnel lens. This results from the substantially similar dimensions of the two lenses, the close spacing between them, and the location of the virtual image as seen through them. The aforementioned line image must be capable of being raised or lowered as hereinbefore described. Consequently, the field which must be imaged by the Fresnel includes all the possible positions of all the filaments behind that particular Fresnel. With an optical system as simple as a Fresnel lens it is not possible to achieve more than a compromise solution for a number of field points. Such a compromise will allow adequate definition for the various pertinent parts of the field, but this field will tend to be curved in both vertical and horizontal sections. Consequently the string of four filaments in each cell was so arranged as to approximate the curvature of field of the Fresnel as seen in plan view. FIG. 5 depicts the four lamps in which the filaments of the two outboard lamps are approximately seven hundredths of an inch closer to the Fresnel lens than the filaments of the inboard lamps. Further, as the lamps are displaced vertically, they are moved by a cam toward or away from the Fresnel lens so as to follow approximately the curvature of field of the Fresnel lens as seen in a vertical section. This design was found to give optimum results for any Fresnel zone and lamp filament combination, thereby insuring negligible distortion on the face of the Fresnel lens when viewed at either short or long range. Additionally, the transition from the image of one set of lamps seen through the lens associated with that set of lamps to that of the adjacent set of lamps as seen through the adjacent lens is smooth and undistorted. Therefore if the pilot is high or low with respect to the center or glide path position during landing, he will not see a "jump" in the image as he modifies his position relative to the system axis.

While a preferred embodiment of the instant invention has been described in connection with the landing of aircraft, it must be understood that the foregoing description is meant to be illustrative only and is not limitative of the invention. The concepts employed in the optical device of the instant invention may be utilized in various applications not specifically mentioned herein; and further modifications will suggest themselves to those skilled in the art. All such modifications as are in accord with the foregoing principles are therefore meant to fall within the scope of the appended claims.

What is claimed is:

1. An optical device for displaying the image of a plurality of reference objects to an observer, comprising a plurality of adjacent cells; each of said cells comprising a reference object, and a lens system positioned with respect to said reference object to form thereof a virtual image; said plurality of lens systems having contiguous pupils defining a system pupil of said optical device; said last pupil being oriented toward said observer; said plurality of lens systems and reference objects being so disposed with respect to one another that the plurality of virtual images of said reference objects formed by said lens systems coincide with one another; said plurality of coincident virtual images appearing to said observer as a single virtual image visible through said system pupil.

2. An optical device as defined in claim 1 wherein means are provided for collectively displacing said reference objects with respect to their associated lens systems.

3. An optical device as defined in claim 2 wherein said means for displacing said reference objects with respect to their associated lens systems comprises a common bracket for mounting said reference objects, said objects being adapted to move in a curved locus in response to the displacement of said common bracket, said curved locus approximating the curvature of field of the lens systems through which said reference objects are imaged.

4. An optical device for displaying the image of a plurality of reference objects to an observer comprising; a plurality of adjacent cells; each of said cells comprising a reference object, a first lens system for producing a magnified virtual image of said object, and a second lens system disposed with respect to said first lens system for providing controlled dispersion of the rays of light emerging from said first lens system; said adjacent cells having contiguous pupils which comprise a system pupil of said optical devices; said plurality of first lens systems and reference objects being so disposed with respect to one another that the plurality of virtual images of said reference objects formed by said first lens systems coincide with one another; said plurality of coincident virtual images appearing to the observer as a single virtual image visible through said system pupil.

5. An optical device for indicating to an observer an optimum path of travel comprising; a plurality of adjacent cells; each of said cells comprising a plurality of reference lights, a Fresnel lens for producing a magnified virtual image of said lights, and a lenticular spreader disposed with respect to said Fresnel lens for dispersing the rays of light emerging from said Fresnel lens; said adjacent cells having contiguous pupils which comprise a system pupil of said optical devices; said last pupil being oriented toward said observer; said plurality of Fresnel lenses and reference lights being so disposed with respect to one another that the plurality of virtual images of said reference lights formed by said Fresnel lenses coincide with one another; said plurality of coincident virtual images appearing to said observer as a single virtual image visible through said system pupil, whereby the position of said latter image may be viewed in relation to a datum marker; the apparent displacement of said datum marker with respect to said virtual image as seen by the observer through the system pupil indicating a deviation from said optimum path of travel.

6. An optical glide path indicator for assisting a pilot in flying an aircraft along a defined angle of approach to a landing area comprising an assembly suitably positioned with respect to the landing area; said assembly comprising a plurality of optical cells; each of said cells comprising a source of light, a first lens so positioned with respect to said light source that a virtual image of said source is formed, a second lens positioned with respect to said first lens for diffusing the rays of light emerging from said first lens; said optical cells having contiguous pupils defining a viewing window of said glide path indicator; said window being oriented toward approaching aircraft; said plurality of optical cells having their first lenses and light sources oriented with respect to one another in such a manner that the plurality of virtual images produced by said cells coincide with one another; said plurailty of virtual images appearing through said viewing window as a single virtual image visible only through the lenses of the particular cell which lie in the pilot's line of sight to said virtual image, whereby the position of said single virtual image can be viewed in relation to a fixed marker placed in close proximity with said glide path indicator assembly; the apparent displacement of said fixed marker with respect to said virtual image as seen by the pilot being indicatory of deviation in the aircraft's altitude from said defined angle of approach.

7. An optical device for aiding the pilot of an aircraft to follow a predetermined glide path while landing on an area of restricted size comprising an indicator assembly positioned on said landing area; said indicator assembly comprising a plurality of cells; each of said cells comprising an array of light sources, a Fresnel lens situated such that said array of light sources lies within the focal length of said Fresnel lens, said lens thereby forming a magnified virtual image of said sources, a lenticular spreader positioned with respect to said Fresnel lens for diffusing the light rays emerging from the Freshnel lens; said plurality of cells having contiguous pupils defining a viewing window of said optical device; said window being visible to the pilot of an aircraft approaching said landing area; said plurality of cells having their Fresnel lenses and light sources arranged in such a manner that the plurality of virtual images produced by said cells are coincident; said plurality of virtual images appearing through said viewing window as a single virtual image visible only through the pupils of the Fresnel lenses which lie in the pilot's line of sight to said virtual image, whereby the position of said latter image can be viewed by the pilot in relation to a fixed marker; the apparent displacement of said fixed marker with respect to said virtual image as viewed through the viewing window by the pilot being indicatory of deviation in the aircraft's attitude with respect to said predetermined glide path.

8. An optical device for presenting a visual indication of a defined glide path to the pilot of an aircraft landing on the flight deck of a ship comprising an indicator assembly; said indicator assembly comprising a plurality of cells; each of said cells comprising an array of light sources, a Fresnel lens situated in such a manner that said light sources lie within the focal length of said Fresnel lens, said lens thereby forming a magnified virtual image of said sources, a lenticular spreader positioned with respect to said Fresnel lens for diffusing the light rays emerging from the Freshnel lens: said plurality of cells having contiguous pupils defining a viewing window of said optical device; said window being situated at one end of said assembly and being oriented toward oncoming aircraft; said plurality of cells having their Fresnel lenses and light sources arranged in such a manner that the plurality of virtual images produced by said cells are coincident; said plurality of virtual images appearing to the pilot as a single virtual image through the viewing window; said plurality of light sources in the indicator assembly being mounted on a common bracket; means for simultaneously changing the location of all said light sources with respect to their associated Fresnel lenses so as to modify the glide path indication as seen through said viewing window, whereby the alignment of said latter indication with a fixed marker is indicative of the aircraft's approach along said defined glide path.

9. An optical device as defined in claim 8 wherein the means for changing the location of said light sources with respect to the Fresnel lenses is controlled by stabilization means in order to compensate for the pitching movement of the ship, said indicator assembly remaining in a fixed position on said flight deck.

10. An optical device for aiding the pilot of an aircraft to pursue a defined glide path while approaching the landing area comprising an indicator assembly mounted on said area and adapted to be inclined with respect to a horizontal reference; said assembly comprising a plurality of cells; each of said cells comprising a plurality of lamp filaments as a source of light, a Fresnel lens consisting of a segment of a spherical shell and forming a virtual image of said lamp filaments, a cylindrical ribbed lenticular positioned with respect to said Fresnel lens and adapted for horizontally spreading the light rays emerging from said Fresnel lens; means for displacing said groups of lamp filaments collectively with respect to their associated Fresnel lenses; said plurality of cells having contiguous pupils forming a viewing window of said optical device; said window being situated at one end of said indicator assembly and being visible to the pilot of an approaching aircraft; said plurality of cells having their Fresnel lenses and lamp filaments so arranged that the plurality of virtual images produced by said cells are coincident; said plurality of virtual images appearing to the pilot as a single image through the viewing window of said indicator assembly, whereby the position of said single image can be compared to a fixed marker mounted adjacent to said indicator assembly; a fixed marker directly visible to the pilot and mounted adjacent to said indicator assembly; the apparent displacement of said fixed marker with respect to said virtual image as seen through the viewing window by the pilot being indicatory of deviation in the aircraft's attitude with respect to said defined glide path.

11. An optical device as defined in claim 10 wherein said plurality of lamp filaments contained in each cell are supported by a member having lamp mounting positions arranged in a curved locus approximating the curvature of field of the Fresnel lens through which said filaments are imaged.

12. An optical device as defined in claim 11 wherein said means for displacing said groups of lamp filaments comprises a common bracket for mounting said lamp supporting members, said members being adapted to move in a curved locus in response to the displacement of said bracket, said curved locus approximating the curvature of field of the Fresnel lens through which said lamp filaments are imaged.

13. An optical device for displaying the image of a plurality of reference objects to an observer, comprising a plurality of adjacent cells; each of said cells comprising a reference object and a lens system positioned with respect to said reference object to form thereof an image; said plurality of lens systems having contiguous pupils defining a system pupil of said optical device; said last pupil being oriented toward said observer; said plurality of lens systems and reference objects being so disposed with respect to one another that the plurality of images of said reference objects formed by said lens systems coincide with one another; said plurality of coincident images appearing to said observer as a single image visible through said system pupil.

14. An optical device as defined in claim 13 wherein means are provided for collectively displacing said reference objects with respect to their associated lens systems.

References Cited in the file of this patent

UNITED STATES PATENTS

| 1,337,880 | Bernard | Apr. 20, 1920 |
| 1,941,503 | Villiers | Jan. 2, 1934 |
| 2,784,925 | Goodhart | Mar. 12, 1957 |